(12) United States Patent
Nagata et al.

(10) Patent No.: US 12,367,720 B2
(45) Date of Patent: Jul. 22, 2025

(54) INFORMATION PROCESSING DEVICE, INFORMATION PROCESSING METHOD, AND STORAGE MEDIUM

(71) Applicants: TOYOTA JIDOSHA KABUSHIKI KAISHA, Toyota (JP); DENSO CORPORATION, Kariya (JP)

(72) Inventors: Yu Nagata, Chofu (JP); Keiichi Uno, Kariya (JP)

(73) Assignees: TOYOTA JIDOSHA KABUSHIKI KAISHA CORPORATION, Toyota (JP); DENSO CORPORATION, Kariya (JP)

( * ) Notice: Subject to any disclaimer, the term of this patent is extended or adjusted under 35 U.S.C. 154(b) by 0 days.

(21) Appl. No.: 18/406,253

(22) Filed: Jan. 8, 2024

(65) Prior Publication Data
US 2024/0282154 A1 Aug. 22, 2024

(30) Foreign Application Priority Data

Feb. 16, 2023 (JP) .................................. 2023-022832

(51) Int. Cl.
G07C 5/08 (2006.01)
G08B 21/18 (2006.01)

(52) U.S. Cl.
CPC ......... *G07C 5/0816* (2013.01); *G08B 21/182* (2013.01)

(58) Field of Classification Search
CPC ........................... G07C 5/0816; G08B 21/182
USPC ......................................................... 340/438
See application file for complete search history.

(56) References Cited

U.S. PATENT DOCUMENTS

| | | | | |
|---|---|---|---|---|
| 6,617,980 B2 * | 9/2003 | Endo | .................. | G08G 1/09675 340/988 |
| 11,012,667 B1 * | 5/2021 | Nodder | .................. | H04N 7/181 |
| 11,129,000 B2 * | 9/2021 | Kim | ..................... | G08G 1/0112 |
| 11,798,394 B2 * | 10/2023 | Kawamura | .......... | G08B 25/004 |
| 2003/0086539 A1 * | 5/2003 | McCalmont | ............ | H04Q 3/72 379/46 |
| 2011/0098016 A1 * | 4/2011 | Hatton | .................. | H04W 76/50 704/9 |
| 2012/0094628 A1 * | 4/2012 | Mader | ................ | B60R 21/0136 455/404.1 |
| 2013/0144463 A1 * | 6/2013 | Ricci | ...................... | H04L 67/12 701/1 |

(Continued)

FOREIGN PATENT DOCUMENTS

JP 2016-106321 A 6/2016

*Primary Examiner* — Zhen Y Wu
(74) *Attorney, Agent, or Firm* — Oliff PLC

(57) ABSTRACT

An information processing device includes a processor. The processor receives a report of an abnormality from a reporting terminal installed in a vehicle. The processor calls a first monitor via a first monitor terminal. The processor calls a second monitor via a second monitor terminal when the processor determines that a waiting period for a response from the first monitor terminal exceeds a predetermined period or that a transfer request is input at the first monitor terminal. The processor transfers the report to a terminal of police or an emergency service when the processor determines that a waiting period for a response from the second monitor terminal exceeds a predetermined period or that a transfer request is input at the second monitor terminal.

14 Claims, 7 Drawing Sheets

(56) References Cited

U.S. PATENT DOCUMENTS

2015/0312742 A1* 10/2015 Choi ................. A61B 5/1112
                                                    455/404.2
2022/0383725 A1* 12/2022 Kawamura ............ G08B 21/22
2023/0192220 A1*  6/2023 Na ..................... G08B 31/00
                                                    701/32.2

* cited by examiner

INFORMATION PROCESSING DEVICE, INFORMATION PROCESSING METHOD, AND STORAGE MEDIUM

CROSS-REFERENCE TO RELATED APPLICATION

This application claims priority to Japanese Patent Application No. 2023-022832 filed on Feb. 16, 2023, incorporated herein by reference in its entirety.

BACKGROUND

1. Technical Field

The present disclosure relates to an information processing device, an information processing method, and a storage medium.

2. Description of Related Art

There is known a technology in which one of a plurality of images is displayed in a main screen area and the other images are displayed in sub-screen areas. When a slide operation in a first direction in the main screen area is detected, the sub-screen areas are hidden. The main screen area is displayed as one screen in a display area including the hidden areas (see, for example, Japanese Unexamined Patent Application Publication No. 2016-106321 (JP 2016-106321 A)).

The above technology does not disclose a process when notifications are simultaneously received from a plurality of vehicles in a situation where the vehicles are monitored remotely. There is room for improvement.

SUMMARY

One object of the present disclosure is to efficiently process notifications even when the notifications are simultaneously received from a plurality of vehicles.

According to one aspect of the present disclosure, an information processing device includes a processor. The processor is configured to receive a report of an abnormality from a reporting terminal installed in a vehicle, call a first monitor via a first monitor terminal, determine whether a first waiting period for a response from the first monitor terminal exceeds a first predetermined period, determine whether a first transfer request is input at the first monitor terminal, call a second monitor via a second monitor terminal when the processor has determined that the first waiting period exceeds the first predetermined period or that the first transfer request is input, determine whether a second waiting period for a response from the second monitor terminal exceeds a second predetermined period, determine whether a second transfer request is input at the second monitor terminal, and transfer the report to a terminal of police or an emergency service when the processor has determined that the second waiting period exceeds the second predetermined period or that the second transfer request is input.

According to another aspect of the present disclosure, an information processing method to be performed by an information processing device includes receiving a report of an abnormality from a reporting terminal installed in a vehicle, calling a first monitor via a first monitor terminal, determining whether a first waiting period for a response from the first monitor terminal exceeds a first predetermined period, determining whether a first transfer request is input at the first monitor terminal, calling a second monitor via a second monitor terminal in response to determination that the the first waiting period exceeds the first predetermined period or that the first transfer request is input, determining whether a second waiting period for a response from a second monitor terminal exceeds a second predetermined period, determining whether a second transfer request is input at the second monitor terminal, and transferring the report to a terminal of police or an emergency service in response to determination that the the second waiting period exceeds the second predetermined period or that the second transfer request is input.

According to still another aspect of the present disclosure, a non-transitory storage medium stores instructions. The instructions are executable by one or more processors of an information processing device and cause the one or more processors to perform functions. The functions include receiving a report of an abnormality from a reporting terminal installed in a vehicle, calling a first monitor via a first monitor terminal, determining whether a first waiting period for a response from the first monitor terminal exceeds a first predetermined period, determining whether a first transfer request is input at the first monitor terminal, calling a second monitor via a second monitor terminal in response to determination that the first waiting period exceeds the first predetermined period or that the first transfer request is input, determining whether a second waiting period for a response from the second monitor terminal exceeds a second predetermined period, determining whether a second transfer request is input at the second monitor terminal, and transferring the report to a terminal of police or an emergency service in response to determination that the second waiting period exceeds the second predetermined period or that the second transfer request is input.

According to the aspects of the present disclosure, it is possible to efficiently process the notifications even when the notifications are simultaneously received from the vehicles.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
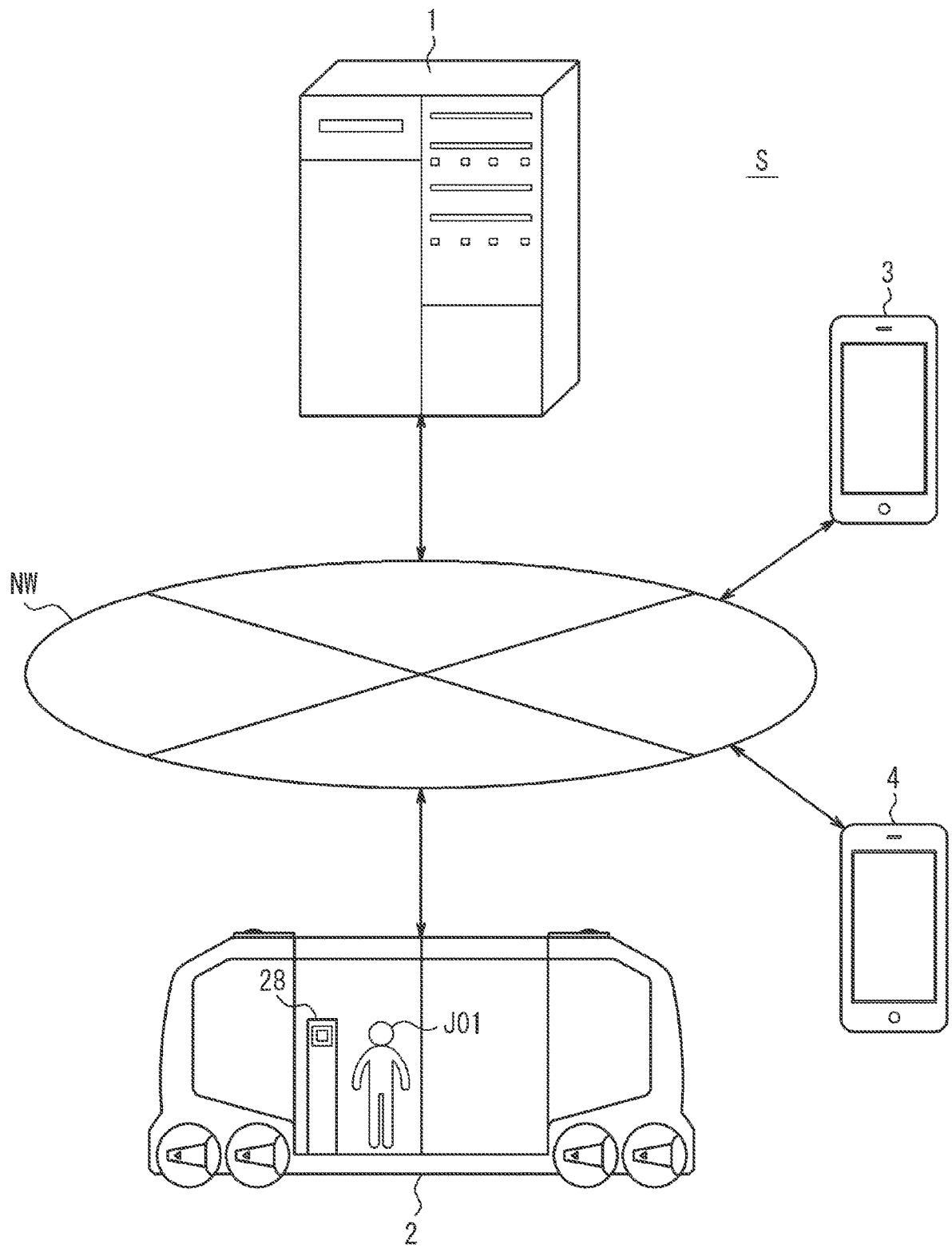
FIG. 1 is a schematic diagram of an information processing system according to an embodiment.

FIG. 1 is a schematic diagram of an information processing system S according to an embodiment. The information processing system S includes an information processing device 1, a vehicle 2, a first monitor terminal 3, and a second monitor terminal 4 that can communicate with each other via a network NW. The network NW includes, for example, a mobile communication network, the Internet, or a fixed communication network.

FIG. 1 shows one information processing device 1, one vehicle 2, one first monitor terminal 3, and one second monitor terminal 4 for the sake of simplicity of the description. However, the numbers of information processing devices 1, vehicles 2, first monitor terminals 3, and second monitor terminals 4 are not limited to these numbers. For example, the processes executed by the information processing device 1 may be executed by a plurality of information processing devices 1 disposed in a distributed manner. The information processing device 1 may communicate with a plurality of vehicles 2. A plurality of first monitor terminals 3 or a plurality of second monitor terminals 4 may be connected to the network NW.

In the present embodiment, the information processing device 1, the first monitor terminal 3, and the second monitor terminal 4 are disposed, for example, in an operation management center. The first monitor terminal 3 and the second monitor terminal 4 remotely monitor disruption of a timetable of the vehicle 2, a system of the vehicle 2, an abnormality of the vehicle 2, and the like. However, the disposition and monitoring targets are not limited to these.

The outline of the processes executed by the information processing device 1 according to the present embodiment will be described. The operation of a control unit 11 of the information processing device 1 includes receiving a report of an abnormality from a reporting terminal 28 installed in the vehicle 2, calling a first monitor via the first monitor terminal 3, calling a second monitor via the second monitor terminal 4 when determination is made that a waiting period for a response from the first monitor terminal 3 has exceeded a predetermined period or that a transfer request has been input at the first monitor terminal 3, and transferring the report to a terminal of police or an emergency service when determination is made that a waiting period for a response from the second monitor terminal 4 has exceeded the predetermined period or that a transfer request has been input at the second monitor terminal 4. With this configuration, the information processing device 1 can efficiently process the notifications even when the notifications are simultaneously received from a plurality of vehicles, thereby reducing the workloads of the monitors.

The information processing device 1 may be a server that supports the provision of services by a business operator. The information processing device 1 may be installed in, for example, a facility dedicated to the business operator or a shared facility including a data center. As an alternative example, the information processing device 1 may be mounted on the vehicle 2. The information processing device 1 may be referred to as "center server".

The vehicle 2 is any type of vehicle such as a gasoline vehicle, a diesel vehicle, an HEV, a PHEV, a BEV, or an FCEV. The term "HEV" is an abbreviation for "hybrid electric vehicle". The term "PHEV" is an abbreviation for "plug-in hybrid electric vehicle". The term "BEV" is an abbreviation for "battery electric vehicle". The term "FCEV" is an abbreviation for "fuel cell electric vehicle". The driving of the vehicle 2 may be automated at any level. For example, the automation level is any one of Level 1 to Level 5 defined by SAE. The term "SAE" is an abbreviation for "Society of Automotive Engineers". The vehicle 2 may be a MaaS vehicle. The term "MaaS" is an abbreviation for "Mobility as a Service". As an alternative example, the vehicle 2 may be driven by a driver.

The first monitor terminal 3 is operated by a first monitor who monitors the vehicle 2 remotely. The second monitor terminal 4 is operated by a second monitor who monitors the vehicle 2 remotely. The monitor is also referred to as "remote monitor". Each of the first monitor terminal 3 and the second monitor terminal 4 is a mobile device such as a smartphone, a mobile phone, a wearable device, or a tablet. As an alternative example, each of the first monitor terminal 3 and the second monitor terminal 4 may be a general-purpose device such as a PC, or a dedicated device. The term "PC" is an abbreviation for "personal computer".

Figure 2:
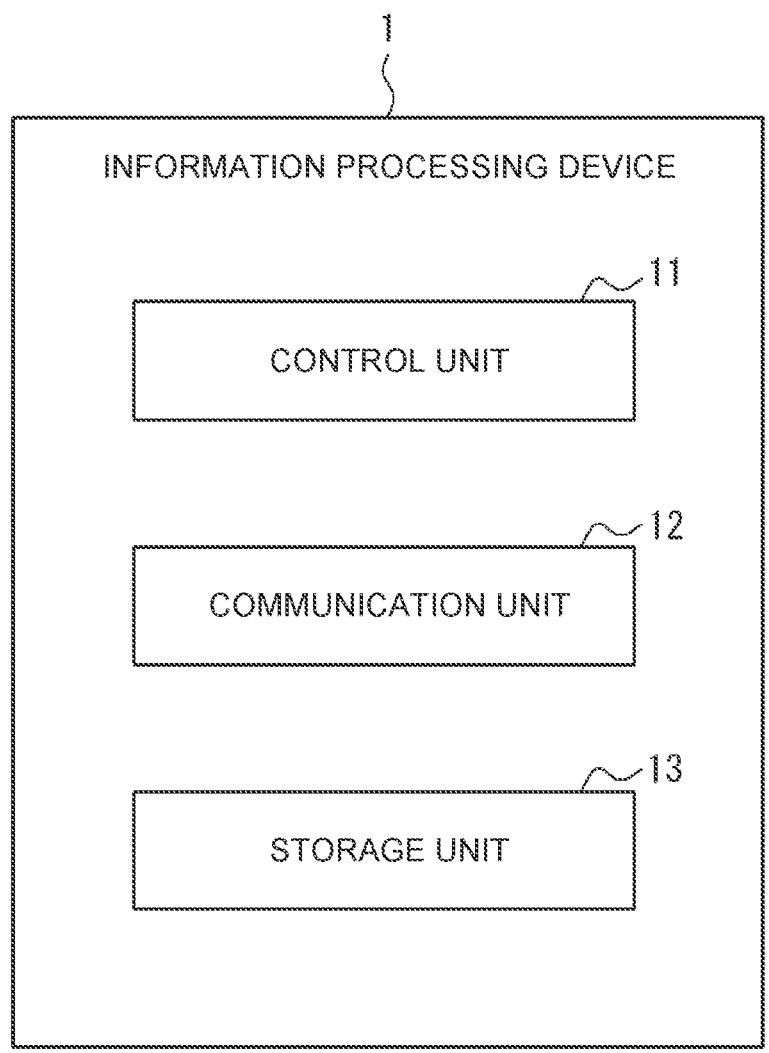
FIG. 2 is a block diagram showing the configuration of an information processing device.

In FIG. 2, the internal configuration of the information processing device 1 will be described in detail.

The information processing device 1 includes the control unit 11, a communication unit 12, and a storage unit 13. The components of the information processing device 1 are connected to communicate with each other via, for example, a dedicated line.

The control unit 11 includes, for example, one or more general-purpose processors including a central processing unit (CPU) or a micro processing unit (MPU). The control unit 11 may include one or more dedicated processors specialized in a specific process. The control unit 11 may include one or more dedicated circuits instead of including the processor. Examples of the dedicated circuit include a field-programmable gate array (FPGA) and an application-specific integrated circuit (ASIC). The control unit 11 may include an electronic control unit (ECU). The control unit 11 transmits and receives any information via the communication unit 12.

The communication unit 12 includes one or more communication modules for connecting to the network NW. The communication unit 12 may include a module conforming to one or more mobile communication standards such as the long term evolution (LTE), the fourth generation (4G), or the fifth generation (5G). The communication unit 12 may include a communication module and the like conforming to one or more short-range communication standards or specifications including Bluetooth (registered trademark), Air Drop (registered trademark), infrared data association (IrDA), ZigBee (registered trademark), FeliCa (registered trademark), or radio frequency identifier (RFID). The communication unit 12 transmits and receives any information via the network NW.

The storage unit 13 includes, for example, a semiconductor memory, a magnetic memory, an optical memory, or a combination of at least two of them. However, the present disclosure is not limited to this. The semiconductor memory is, for example, a random access memory (RAM) or a read-only memory (ROM). The RAM is, for example, a static random access memory (SRAM) or a dynamic random access memory (DRAM). The ROM is, for example, an electrically erasable programmable read-only memory (EEPROM). The storage unit 13 may function as, for example, a main storage device, an auxiliary storage device, or a cache memory. The storage unit 13 may store information on the result of analysis or processing by the control unit 11. The storage unit 13 may store various types of information and the like related to the operation or control of the information processing device 1. The storage unit 13 may store a system program, an application program, embedded software, and the like. The storage unit 13 may be provided outside the information processing device 1 and accessed from the information processing device 1.

Figure 3:
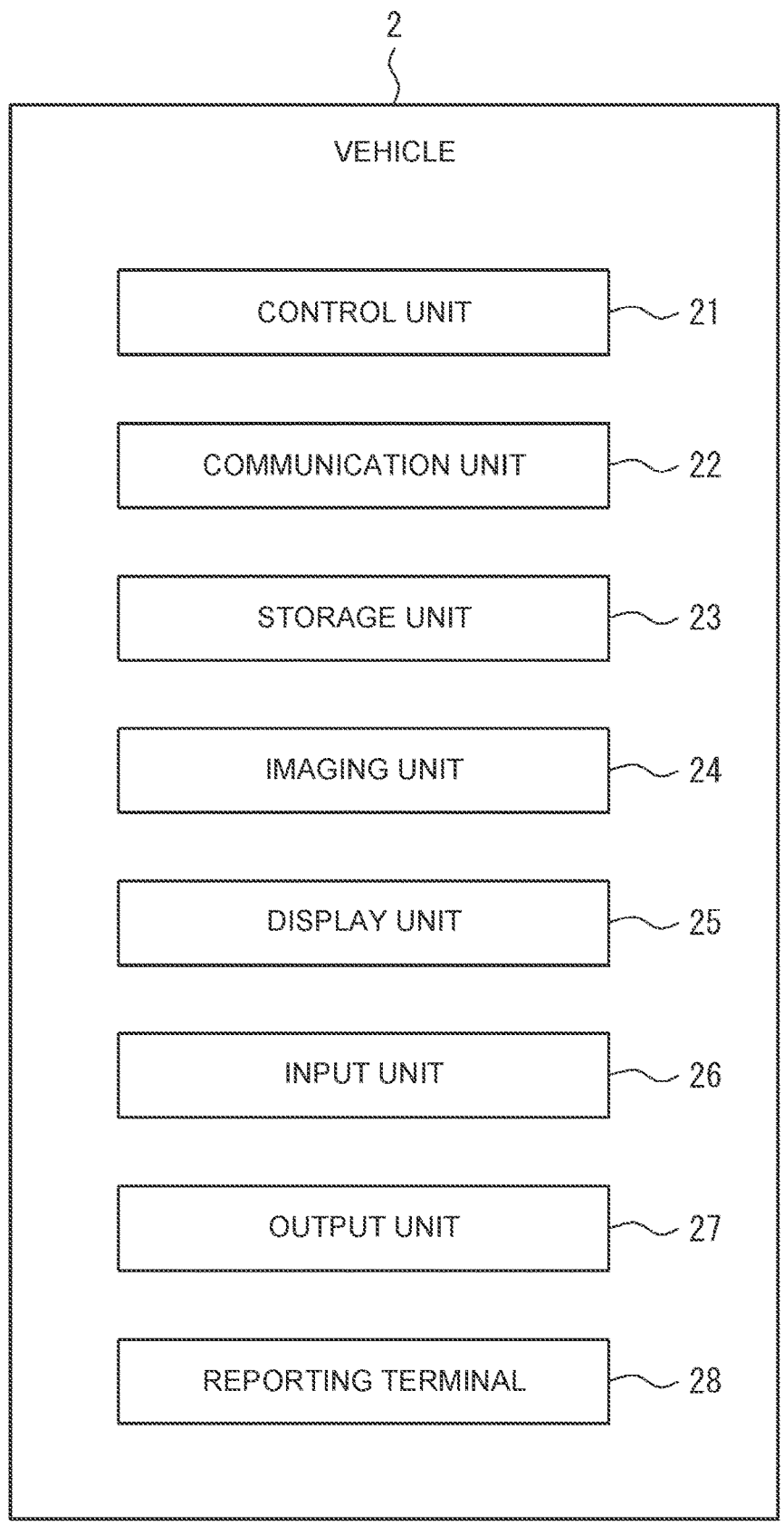
FIG. 3 is a block diagram showing the configuration of a vehicle.

In FIG. 3, the internal configuration of the vehicle 2 will be described in detail.

The vehicle 2 includes a control unit 21, a communication unit 22, a storage unit 23, an imaging unit 24, a display unit 25, an input unit 26, an output unit 27, and the reporting terminal 28. The components of the vehicle 2 are connected to communicate with each other via, for example, a dedicated line.

The description of the hardware configurations of the control unit 21, the communication unit 22, and the storage unit 23 may be the same as the description of the hardware configurations of the control unit 11, the communication unit 12, and the storage unit 13. The description is omitted herein.

The vehicle 2 of the present embodiment performs autonomous driving. The storage unit 23 of the vehicle 2 stores autonomous driving kit (ADK) software for autonomous driving, and conductor software. The vehicle 2 may be controlled by the information processing device 1.

The imaging unit 24 includes a camera and captures images. The image may be a still image or a moving image. The imaging unit 24 may generate an image and record the generated image in the storage unit 23. The imaging unit 24 may include a camera that supports remote control on the vehicle 2 and a surveillance camera for a conductor.

The display unit 25 is, for example, a display. The display is, for example, an LCD or an organic EL display. The term "LCD" is an abbreviation for "liquid crystal display". The term "EL" is an abbreviation for "electroluminescence". The display unit 25 may be connected to the vehicle 2 as an external output device instead of being provided in the vehicle 2. As a connection method, for example, any method such as a USB, an HDMI (registered trademark), or Bluetooth (registered trademark) can be used. The term "USB" is an abbreviation for "universal serial bus". The term "HDMI (registered trademark)" is an abbreviation for "high-definition multimedia interface". The display unit 25 may be signage. The display unit 25 may be a touch panel.

The input unit 26 is, for example, a microphone, a physical key, a capacitive key, a pointing device, or a touch screen integrated with a display. The input unit 26 receives an operation of inputting information to be used for the operation of the vehicle 2. The input unit 26 may be connected to the vehicle 2 as an external input device instead of being provided in the vehicle 2. As a connection method, for example, any method such as a USB, an HDMI (registered trademark), or Bluetooth (registered trademark) can be used.

The output unit 27 includes one or more output interfaces that output information to notify a user. Examples of the output interface in the output unit 27 include, but not limited to, a speaker that outputs information in the form of audio. For example, the output unit 27 may be any broadcasting equipment.

The reporting terminal 28 is installed in the vehicle 2. The reporting terminal 28 receives reports from passengers and notifies the information processing device 1 about the reports. The report is also referred to as "escalation". The reporting terminal 28 may include the display unit 25, the input unit 26, and the output unit 27. The reporting terminal 28 can receive selection of a report type from the passenger via the input unit of the reporting terminal 28, and notify the information processing device 1 about the report type.

The vehicle 2 may further include sensors. The vehicle 2 may further include a conversation device for conversation between the passenger and an operator of the information processing device 1. The vehicle 2 may further include various buttons for operation.

Figure 4:
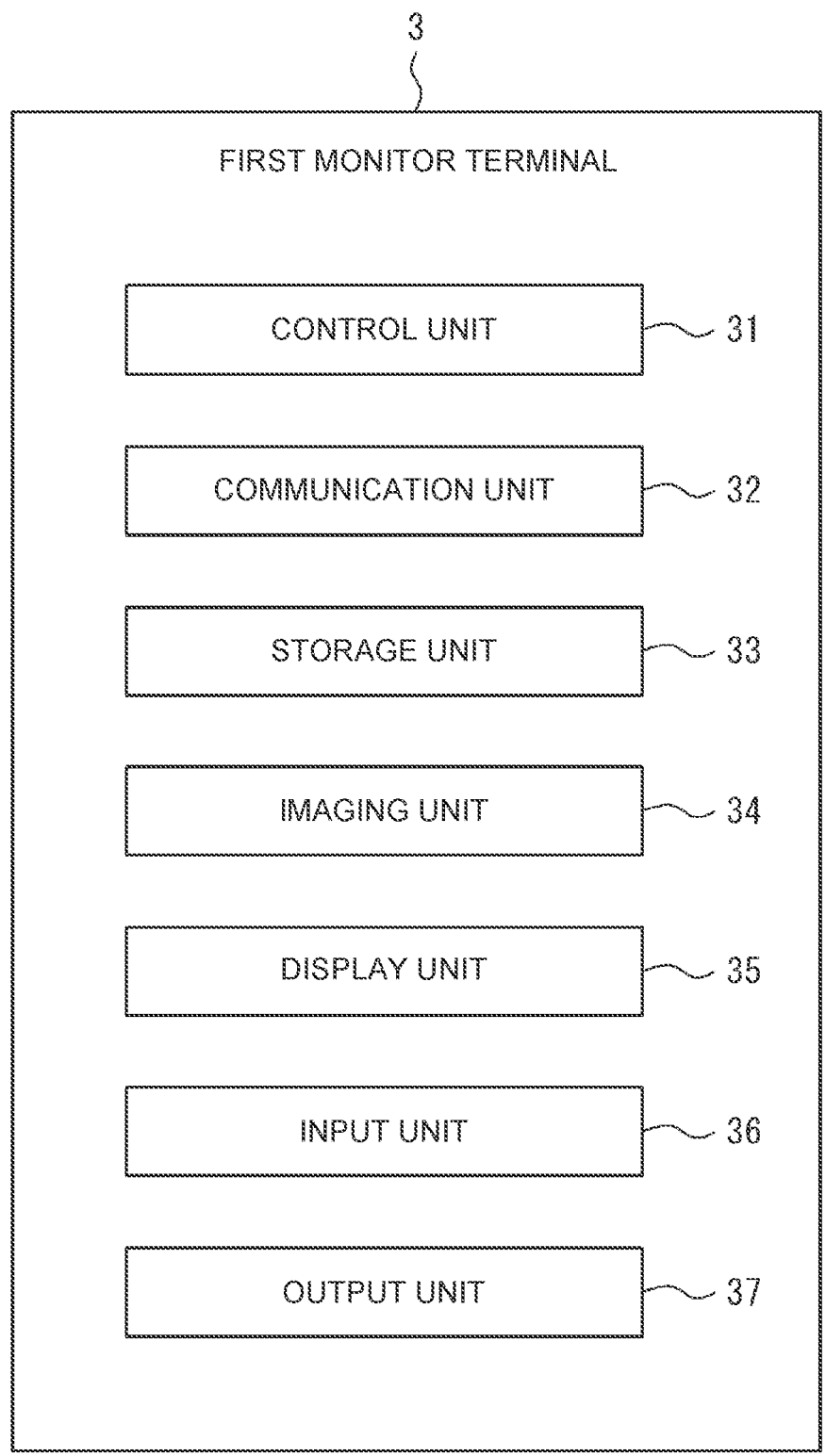
FIG. 4 is a block diagram showing the configuration of a first monitor terminal.

In FIG. 4, the internal configuration of the first monitor terminal 3 will be described in detail.

The first monitor terminal 3 includes a control unit 31, a communication unit 32, a storage unit 33, an imaging unit 34, a display unit 35, an input unit 36, and an output unit 37. The components of the first monitor terminal 3 are connected to communicate with each other via, for example, a dedicated line.

The description of the hardware configurations of the control unit 31, the communication unit 32, the storage unit 33, the imaging unit 34, the display unit 35, the input unit 36, and the output unit 37 of the first monitor terminal 3 may be the same as the description of the hardware configurations of the control unit 21, the communication unit 22, the storage unit 23, the imaging unit 24, the display unit 25, the input unit 26, and the output unit 27 of the vehicle 2. The description is omitted herein.

Figure 5:
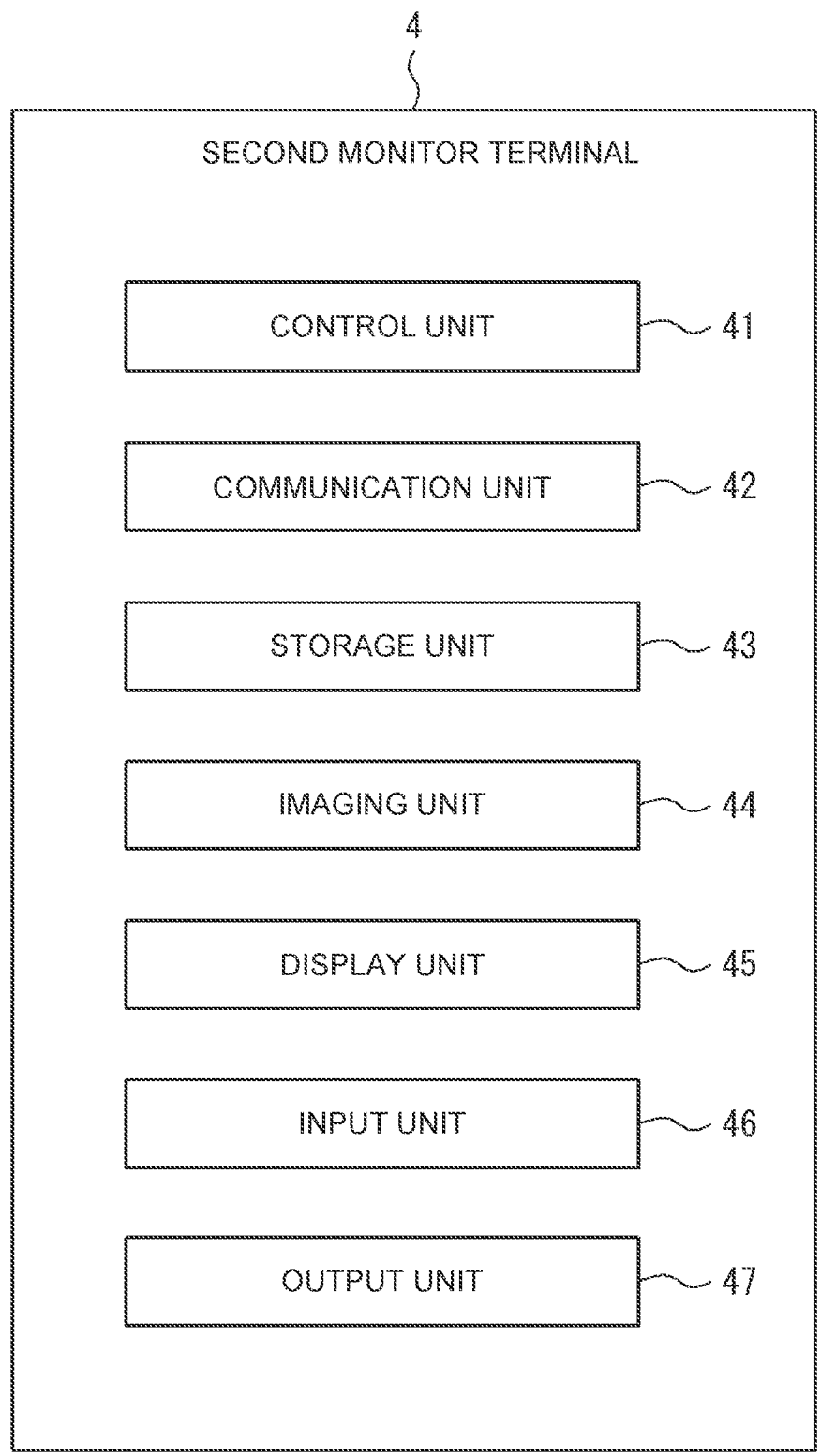
FIG. 5 is a block diagram showing the configuration of a second monitor terminal.

In FIG. 5, the internal configuration of the second monitor terminal 4 will be described in detail.

The second monitor terminal 4 includes a control unit 41, a communication unit 42, a storage unit 43, an imaging unit 44, a display unit 45, an input unit 46, and an output unit 47. The components of the second monitor terminal 4 are connected to communicate with each other via, for example, a dedicated line.

The description of the hardware configurations of the control unit 41, the communication unit 42, the storage unit 43, the imaging unit 44, the display unit 45, the input unit 46, and the output unit 47 of the second monitor terminal 4 may be the same as the description of the hardware configurations of the control unit 31, the communication unit 32, the storage unit 33, the imaging unit 34, the display unit 35, the input unit 36, and the output unit 37 of the first monitor terminal 3. The description is omitted herein.

An information processing method to be executed by the information processing system S according to the present embodiment will be described in detail. For example, the first monitor who operates the first monitor terminal 3 monitors the vehicle 2. The monitoring may be performed, for example, via the display unit 35 of the first monitor terminal 3. Although the number of vehicles 2 is plural, it may be one as an alternative example. For convenience of the description, each of the vehicles will be referred to as "vehicle 2". The vehicle 2 is a passenger vehicle such as a bus. When a passenger J01 of the vehicle 2 has found an abnormality in the vehicle 2, the passenger J01 operates the reporting terminal 28 to report the abnormality. When making a report, the passenger J01 can select a report type at the reporting terminal 28. The report type is set according to the degree of emergency or importance. Examples of the report type include at least one of the following.

TYPE 1: Accident
TYPE 2: Incident
TYPE 3: Injury
TYPE 4: Stop request
TYPE 5: Inquiry Type 1 indicates a situation where the police or emergency services are involved. Type 2 indicates a situation where the police are involved. Type 3 indicates a situation where the emergency services are involved.

Figure 6:
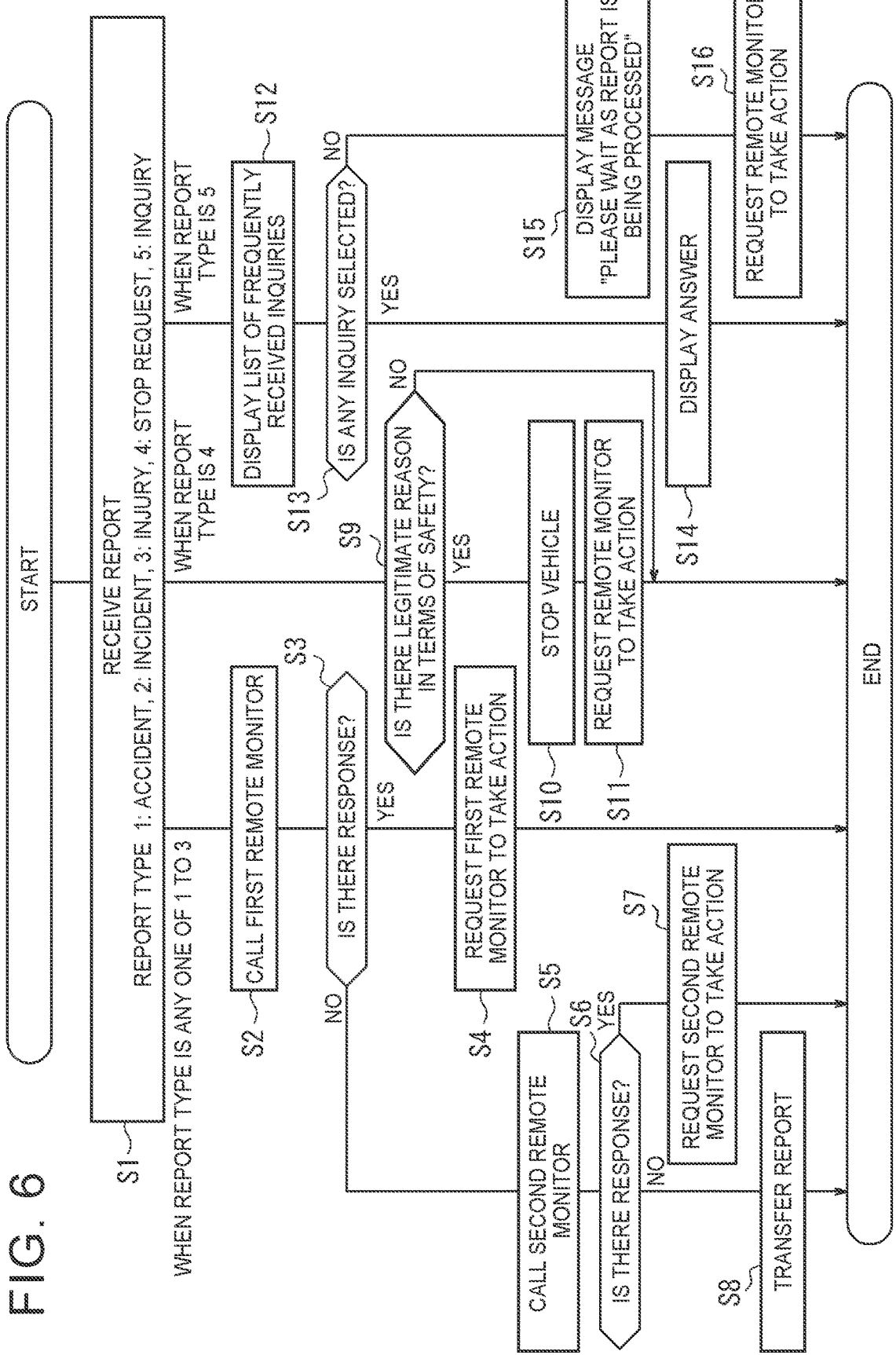
FIG. 6 is a flowchart showing a first operation of the information processing device.

In step S1 of FIG. 6, the control unit 11 of the information processing device 1 receives a report from the vehicle 2 together with information indicating the report type. The report type is associated with the report.

When the control unit 11 determines that any one of Types 1 to 3 (that is, incident, accident, or injury) is selected as the report type, the control unit 11 calls the first monitor via the first monitor terminal 3 in step S2. Specifically, the control unit 11 notifies the first monitor terminal 3 about the report. The notification may be performed by at least one of screen display and audio.

In step S3, the control unit 11 determines whether the first monitor terminal 3 has responded within a predetermined period. The predetermined period can be set or changed as appropriate. When the determination result is "Yes" in step S3, the control unit 11 requests the first monitor terminal 3 in step S4 so that the first monitor takes action on the report.

When the control unit 11 determines that a waiting period for waiting for a response from the first monitor terminal 3 has exceeded a predetermined period (that is, timeout) or that a transfer request has been input at the input unit 36 of the first monitor terminal 3 ("No" in step S3), the control unit 11 calls the second monitor via the second monitor terminal 4 in step S5. Specifically, the control unit 11 notifies the second monitor terminal 4 about the report. The second monitor may be, for example, a monitor in an adjacent area, a monitor taking a break, or a monitor ready for shift.

In step S6, the control unit 11 determines whether the second monitor terminal 4 has responded within the predetermined period. When the determination result is "Yes" in step S6, the control unit 11 requests the second monitor terminal 4 in step S7 so that the second monitor takes action on the report.

When the control unit 11 determines that a waiting period for waiting for a response from the second monitor terminal 4 has exceeded the predetermined period or that a transfer request has been input at the input unit 46 of the second monitor terminal 4 ("No" in step S6), the control unit 11 transfers the report to a terminal of the police or the emergency service in step S8.

When the control unit 11 determines that Type 4 is selected as the report type, the control unit 11 determines in step S9 whether the stop request is made for a legitimate reason in terms of safety. For example, the control unit 11 uses a pop-up function to display a message "A fine will be imposed if a report is made for a reason that is not legitimate in terms of safety. Do you still want to make a report?" on the display unit of the reporting terminal 28. This message is displayed to reduce mischievous reporting. As an alternative example, step S9 may be performed by the control unit 21 of the vehicle 2 without communicating with the information processing device 1.

When the determination result is "No" in step S9, the control unit 11 terminates the flow of FIG. 6. When the determination result is "Yes" in step S9, the control unit 11 determines in step S10 to stop the vehicle 2 on a road shoulder or at a safe place and controls the vehicle 2 as determined. In step S11, the control unit 11 requests the first monitor to take action on the report via the first monitor terminal 3.

When the control unit 11 determines that Type 5 is selected as the report type, the control unit 11 notifies the vehicle 2 about a list of frequently received inquiries and causes the display unit 25 to display the list in step S12. Step S12 is performed as a screening process before the monitor takes action. In step S13, the control unit 11 determines whether any one of the frequently received inquiries is selected by the passenger J01. In this case, a chatbot may operate on the display unit 25 to request the passenger J01 to make selection. As an alternative example, steps S12 and S13 may be performed by the vehicle 2 without communicating with the information processing device 1.

When the determination result is "Yes" in step S13, the control unit 11 notifies the vehicle 2 about an answer to the selected inquiry and causes the display unit 25 to display the answer in step S14. As an alternative example, step S14 may be performed by the vehicle 2.

When the determination result is "No" in step S13, the control unit 11 causes the display unit 25 to display a message "Please wait as the report is being processed" in step S15. As an alternative example, step S15 may be performed by the vehicle 2 without communicating with the information processing device 1. In step S16, the control unit 11 requests the first monitor to take action on the report via the first monitor terminal 3.

As an additional example, when an abnormality is detected, the control unit 21 of the vehicle 2 may send, to the information processing device 1, an abnormality notification indicating the status of the abnormality and a time limit for action on the abnormality. The control unit 21 associates one of a plurality of abnormality types with the abnormality notification. The abnormality type may be determined by an algorithm or may be determined by being selected by the passenger J01. As described below, the abnormality types are different in terms of the status and the time limit for action.

Type 1
 Status: Unable to continue operation
 Time limit for action: Immediate (example case: ADK or important safety component has failed)

Type 2
 Status: Decrease in performance or comfort
 Time limit for action: Upon arrival at next bus stop or within five minutes (example case: bus is drivable but performance or comfort of air conditioning or entertainment has decreased)

Type 3
 Status: Maintenance required
 Time limit for action: Upon entry to garage (example case: bus is drivable but maintenance is required due to lights being out during daytime, wipers operating on sunny day, or air pressure tending to decrease)

Figure 7:
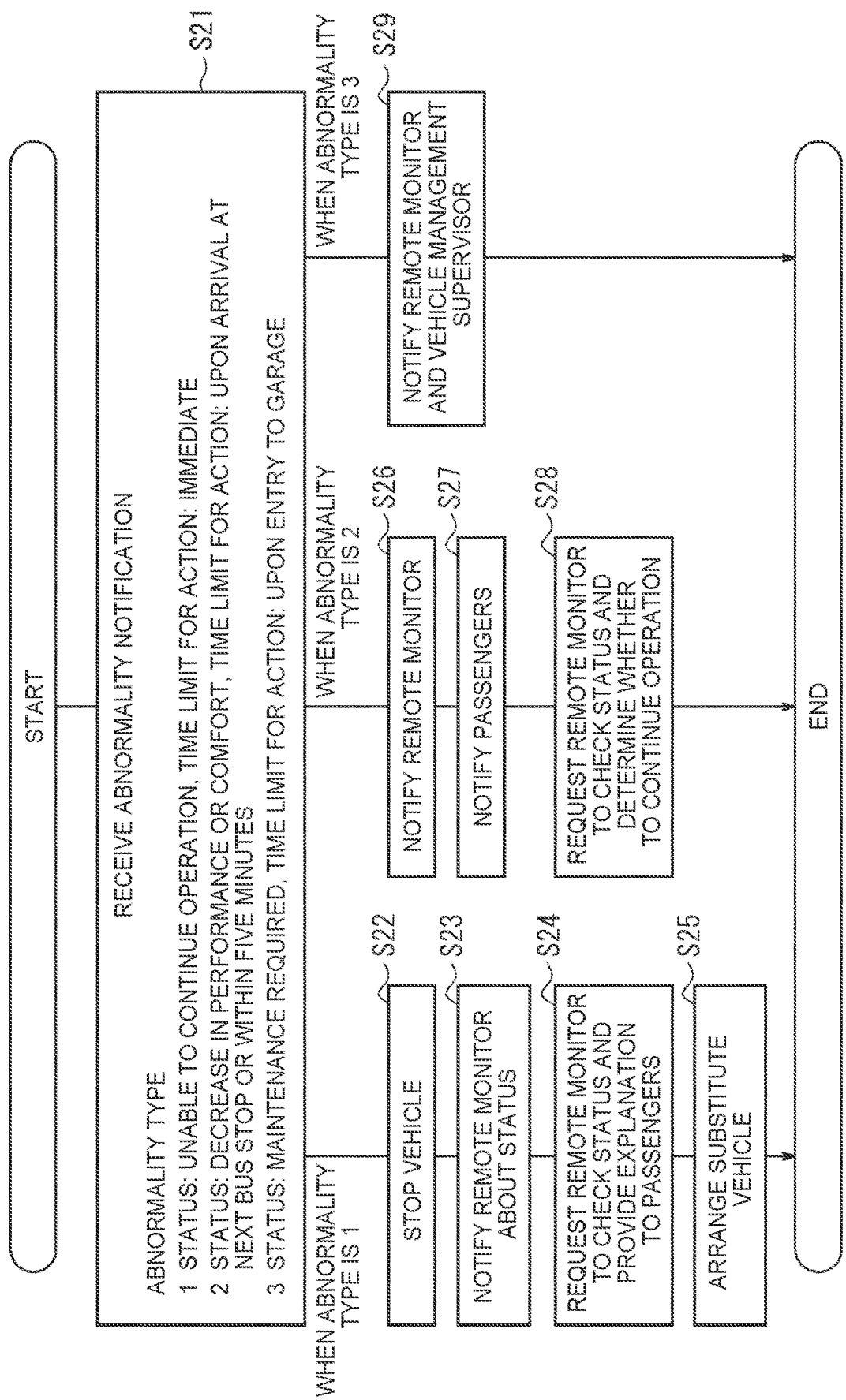
FIG. 7 is a flowchart showing a second operation of the information processing device.

FIG. 7 illustrates the additional example.

In step S21, the control unit 11 receives an abnormality notification associated with an abnormality type from the vehicle 2.

When the control unit 11 determines that the abnormality type is Type 1, the control unit 11 stops the vehicle 2 in step S22. In step S23, the control unit 11 notifies the first monitor terminal 3 about the status. In step S24, the control unit 11 requests the first monitor via the first monitor terminal 3 to check the status of the vehicle 2 and provide an explanation to the passengers. The explanation to the passengers may include a request to get off the vehicle 2. In step S25, the control unit 11 arranges a substitute vehicle for the vehicle 2. As an alternative example, step S25 may be performed before step S24.

When the control unit 11 determines that the abnormality type is Type 2, the control unit 11 notifies the first monitor terminal 3 in step S26 about the need to check the status upon arrival at the next bus stop or within five minutes. In step S27, the control unit 11 notifies the passengers via the display unit 25 or the output unit 27 of the vehicle 2 that "the monitor will check decrease in comfort." In step S28, the control unit 11 requests the first monitor via the first monitor terminal 3 to check the status and determine whether to continue the operation. As an alternative example, step S27 may be performed before step S26 or after step S28.

When the control unit 11 determines that the abnormality type is Type 3, the control unit 11 notifies at least one of the first monitor terminal 3 and a terminal operated by a vehicle management supervisor in step S29 about the need to check the status after the vehicle 2 enters the garage.

As described above, according to the present embodiment, the control unit 11 executes the operation including receiving a report of an abnormality from the reporting terminal 28 installed in the vehicle 2, calling the first monitor via the first monitor terminal 3, calling the second monitor via the second monitor terminal 4 when determination is made that the waiting period for a response from the first monitor terminal 3 has exceeded the predetermined period or that a transfer request has been input at the first monitor terminal 3, and transferring the report to the terminal of police or an emergency service when determination is made that the waiting period for a response from the second monitor terminal 4 has exceeded the predetermined period or that a transfer request has been input at the second monitor terminal 4. With this configuration, the information processing device 1 can efficiently process the notifications even when the notifications are simultaneously received from a plurality of vehicles, thereby reducing the workloads of the monitors.

According to the present embodiment, a report type is associated with the report, and the operation of the control unit 11 includes calling the first monitor when determination is made that the report type is a specific type. The specific type indicates at least one of an accident, an incident, and an injury. The operation of the control unit 11 includes determining, when determination is made that the report type indicates a stop request, whether the stop request is made for a legitimate reason in terms of safety, and determining to stop the vehicle 2 on a road shoulder or at a safe place when determination is made that the stop request is made for the legitimate reason in terms of safety. The operation of the control unit 11 includes notifying the vehicle 2 about a list of frequently received inquiries when determination is made that the report type indicates an inquiry, and notifying the vehicle 2 about an answer to an inquiry selected from the list. With this configuration, the information processing device 1 can perform primary screening of the report, thereby further reducing the workloads of the monitors even when a plurality of notifications has occurred simultaneously. Further, the information processing device 1 can easily grasp the status from a remote location.

According to the present embodiment, the operation of the control unit 11 further includes receiving, from the vehicle 2, an abnormality notification indicating the status of the abnormality and a time limit for action on the abnormality. One of the abnormality types is associated with the abnormality notification, and the abnormality types are different in terms of the status and the time limit for action. With this configuration, the information processing device 1 allows the monitor to take action on each report at the necessary timing even when a plurality of notifications has occurred simultaneously. That is, the monitor need not uniformly and immediately take action on all the reports.

Although the present disclosure has been described above based on the drawings and the embodiment, it should be noted that those skilled in the art may make various modifications and alterations thereto based on the present disclosure. Other changes can be made without departing from the spirit and scope of the present disclosure. For example, the functions and the like included in each means or step can be rearranged so as not to be logically inconsistent, and a plurality of means or steps can be combined into one or divided.

For example, in the above embodiment, a program that executes all or part of the functions or processes of the information processing device 1, the vehicle 2, the first monitor terminal 3, and the second monitor terminal 4 can be recorded in a computer-readable recording medium. The computer-readable recording medium includes a non-transitory computer-readable medium such as a magnetic recording device, an optical disc, a magneto-optical recording medium, or a semiconductor memory. The distribution of the program is carried out, for example, by selling, transferring, or renting a portable recording medium such as a digital versatile disc (DVD) or a compact disc read-only memory (CD-ROM) on which the program is recorded. Further, the distribution of the program may be performed by storing the program in a storage of a server and transmitting the program from the server to another computer. Further, the program may be provided as a program product. The present disclosure can also be realized as a program that can be executed by a processor.

The computer temporarily stores the program recorded in the portable recording medium or the program transferred from the server in the main storage device, for example. The computer then causes the processor to read the program stored in the main storage device, and causes the processor to execute processes in accordance with the read program. The computer may read the program directly from the portable recording medium and execute processes in accordance with the program. The computer may execute the processes in accordance with the received program each time the program is transferred from the server to the computer. The processes may be executed by a so-called ASP service in which the functions are implemented only by execution instructions and result acquisition without transferring the program from the server to the computer. The term "ASP" is an abbreviation for "application service provider". The program includes information that is used for processing by electronic computers and equivalent to a program. For example, data that is not a direct command to a computer but has the property of defining the process of the computer corresponds to the "data equivalent to a program".

A part of the embodiment of the present disclosure is shown as an example below. However, the embodiment of the present disclosure is not limited thereto.

Appendix 1

An information processing device including a control unit, wherein the control unit is configured to execute an operation including receiving a report of an abnormality from a reporting terminal installed in a vehicle, calling a first monitor via a first monitor terminal, calling a second monitor via a second monitor terminal when determination is made that a waiting period for a response from the first monitor terminal has exceeded a predetermined period or that a transfer request has been input at the first monitor terminal, and transferring the report to a terminal of police or an emergency service when determination is made that a waiting period for a response from the second monitor terminal has exceeded the predetermined period or that a transfer request has been input at the second monitor terminal.

Appendix 2

The information processing device according to appendix 1, wherein a report type is associated with the report, and the operation includes calling the first monitor when determination is made that the report type is a specific type.

Appendix 3

The information processing device according to appendix 2, wherein the specific type indicates at least one of an accident, an incident, and an injury.

Appendix 4

The information processing device according to appendix 2 or 3, wherein the operation includes determining, when determination is made that the report type indicates a stop request, whether the stop request is made for a legitimate reason in terms of safety, and determining to stop the vehicle on a road shoulder or at a safe place when determination is made that the stop request is made for the legitimate reason in terms of safety.

Appendix 5

The information processing device according to any one of appendices 2 to 4, wherein the operation includes notifying the vehicle about a list of frequently received inquiries when determination is made that the report type indicates an inquiry, and notifying the vehicle about an answer to an inquiry selected from the list.

Appendix 6

The information processing device according to any one of appendices 1 to 5, wherein the operation further includes receiving, from the vehicle, an abnormality notification indicating a status of the abnormality and a time limit for action on the abnormality.

Appendix 7

The information processing device according to appendix 6, wherein one of a plurality of abnormality types is associated with the abnormality notification, and the abnormality types are different in terms of the status and the time limit for action.

Appendix 8

An information processing method to be performed by an information processing device, the information processing method including receiving a report of an abnormality from a reporting terminal installed in a vehicle, calling a first monitor via a first monitor terminal, calling a second monitor via a second monitor terminal when determination is made that a waiting period for a response from the first monitor terminal has exceeded a predetermined period or that a transfer request has been input at the first monitor terminal, and transferring the report to a terminal of police or an emergency service when determination is made that a waiting period for a response from the second monitor terminal has exceeded the predetermined period or that a transfer request has been input at the second monitor terminal.

Appendix 9

The information processing method according to appendix 8, wherein a report type is associated with the report, and the method includes calling the first monitor when determination is made that the report type is a specific type.

Appendix 10

The information processing method according to appendix 9, wherein the specific type indicates at least one of an accident, an incident, and an injury.

Appendix 11

The information processing method according to appendix 9 or 10, further including determining, when determination is made that the report type indicates a stop request, whether the stop request is made for a legitimate reason in terms of safety, and determining to stop the vehicle on a road shoulder or at a safe place when determination is made that the stop request is made for the legitimate reason in terms of safety.

Appendix 12

The information processing method according to any one of appendices 9 to 11, further including notifying the vehicle about a list of frequently received inquiries when determination is made that the report type indicates an inquiry, and notifying the vehicle about an answer to an inquiry selected from the list.

Appendix 13

The information processing method according to appendix 8, further including receiving, from the vehicle, an abnormality notification indicating a status of the abnormality and a time limit for action on the abnormality.

Appendix 14

The information processing method according to appendix 13, wherein one of a plurality of abnormality types is associated with the abnormality notification, and the abnormality types are different in terms of the status and the time limit for action.

Appendix 15

A program for causing a computer serving as an information processing device to execute an operation including receiving a report of an abnormality from a reporting terminal installed in a vehicle, calling a first monitor via a first monitor terminal, calling a second monitor via a second monitor terminal when determination is made that a waiting period for a response from the first monitor terminal has exceeded a predetermined period or that a transfer request has been input at the first monitor terminal, and transferring the report to a terminal of police or an emergency service when determination is made that a waiting period for a response from the second monitor terminal has exceeded the predetermined period or that a transfer request has been input at the second monitor terminal.

Appendix 16

The program according to appendix 15, wherein a report type is associated with the report, and the operation includes calling the first monitor when determination is made that the report type is a specific type.

Appendix 17

The program according to appendix 16, wherein the specific type indicates at least one of an accident, an incident, and an injury.

Appendix 18

The program according to appendix 16 or 17, wherein the operation includes determining, when determination is made that the report type indicates a stop request, whether the stop request is made for a legitimate reason in terms of safety, and determining to stop the vehicle on a road shoulder or at a safe place when determination is made that the stop request is made for the legitimate reason in terms of safety.

Appendix 19

The program according to any one of appendices 16 to 18, wherein the operation includes notifying the vehicle about a list of frequently received inquiries when determination is made that the report type indicates an inquiry, and notifying the vehicle about an answer to an inquiry selected from the list.

Appendix 20

The program according to appendix 15, wherein the operation further includes receiving, from the vehicle, an abnormality notification indicating a status of the abnormality and a time limit for action on the abnormality.

What is claimed is:

1. An information processing device comprising a processor configured to
receive a report of an abnormality from a reporting terminal installed in a vehicle, a report type being associated with the report,
determine whether the report type is a specific type,
call a first monitor via a first monitor terminal when the processor has determined that the report type is the specific type,
determine whether a first waiting period for a response from the first monitor terminal exceeds a first predetermined period,
determine whether a first transfer request is input at the first monitor terminal,
call a second monitor via a second monitor terminal when the processor has determined that the first waiting period exceeds the first predetermined period or that the first transfer request is input,
determine whether a second waiting period for a response from the second monitor terminal exceeds a second predetermined period,
determine whether a second transfer request is input at the second monitor terminal, and
transfer the report to a terminal of police or an emergency service when the processor has determined that the second waiting period exceeds the second predetermined period or that the second transfer request is input, and wherein the processor is further configured to
determine whether the report type indicates a stop request,
determine whether the stop request is made for a legitimate reason in terms of safety when the processor has determined that the report type indicates the stop request, and
determine to stop the vehicle on a road shoulder or at a safe place when the processor has determined that the stop request is made for the legitimate reason.

2. The information processing device according to claim 1, wherein the specific type indicates at least one of an accident, an incident, and an injury.

3. The information processing device according to claim 1, wherein the processor is configured to
determine whether the report type indicates an inquiry,
notify the vehicle about a list of frequently received inquiries when the processor has determined that the report type indicates the inquiry, and
notify the vehicle about an answer to an inquiry selected from the list.

4. The information processing device according to claim 1, wherein the processor is further configured to receive, from the vehicle, an abnormality notification indicating a status of the abnormality and a time limit for action on the abnormality.

5. The information processing device according to claim 4, wherein:
one of abnormality types is associated with the abnormality notification; and
the abnormality types are different in terms of the status and the time limit for action.

6. An information processing method to be performed by an information processing device, the information processing method comprising:
receiving a report of an abnormality from a reporting terminal installed in a vehicle, a report type being associated with the report;
determining whether the report type is a specific type;
calling a first monitor via a first monitor terminal in response to determination that the report type is the specific type;
determining whether a first waiting period for a response from the first monitor terminal exceeds a first predetermined period;
determining whether a first transfer request is input at the first monitor terminal;
calling a second monitor via a second monitor terminal in response to determination that the first waiting period exceeds the first predetermined period or that the first transfer request is input;
determining whether a second waiting period for a response from a second monitor terminal exceeds a second predetermined period;
determining whether a second transfer request is input at the second monitor terminal; and
transferring the report to a terminal of police or an emergency service in response to determination that the second waiting period exceeds the second predetermined period or that the second transfer request is input, and wherein the information processing method further comprises:
determining whether the report type indicates a stop request;
determining whether the stop request is made for a legitimate reason in terms of safety in response to determination that the report type indicates the stop request; and
determining to stop the vehicle on a road shoulder or at a safe place in response to determination that the stop request is made for the legitimate reason.

7. The information processing method according to claim 6, wherein the specific type indicates at least one of an accident, an incident, and an injury.

8. The information processing method according to claim 6, comprising:
  determining whether the report type indicates an inquiry;
  notifying the vehicle about a list of frequently received inquiries in response to determination that the report type indicates the inquiry; and
  notifying the vehicle about an answer to an inquiry selected from the list.

9. The information processing method according to claim 6, further comprising receiving, from the vehicle, an abnormality notification indicating a status of the abnormality and a time limit for action on the abnormality.

10. The information processing method according to claim 9, wherein:
  one of abnormality types is associated with the abnormality notification; and
  the abnormality types are different in terms of the status and the time limit for action.

11. An information processing method to be performed by an information processing device, the information processing method comprising:
  receiving a report of an abnormality from a reporting terminal installed in a vehicle, a report type being associated with the report;
  determining whether the report type is a specific type;
  calling a first monitor via a first monitor terminal in response to determination that the report type is the specific type;
  determining whether a first waiting period for a response from the first monitor terminal exceeds a first predetermined period;
  determining whether a first transfer request is input at the first monitor terminal;
  calling a second monitor via a second monitor terminal in response to determination that the first waiting period exceeds the first predetermined period or that the first transfer request is input;
  determining whether a second waiting period for a response from a second monitor terminal exceeds a second predetermined period;
  determining whether a second transfer request is input at the second monitor terminal; and
  transferring the report to a terminal of police or an emergency service in response to determination that the second waiting period exceeds the second predetermined period or that the second transfer request is input, and wherein the information processing method further comprises:
  determining whether the report type indicates an inquiry;
  notifying the vehicle about a list of frequently received inquiries in response to determination that the report type indicates the inquiry; and
  notifying the vehicle about an answer to an inquiry selected from the list.

12. The information processing method according to claim 11, wherein the specific type indicates at least one of an accident, an incident, and an injury.

13. The information processing method according to claim 11, further comprising receiving, from the vehicle, an abnormality notification indicating a status of the abnormality and a time limit for action on the abnormality.

14. The information processing method according to claim 13, wherein:
  one of abnormality types is associated with the abnormality notification; and
  the abnormality types are different in terms of the status and the time limit for action.

* * * * *